June 24, 1941.　　D. T. BRADLEY　　2,247,163

COUPLING

Filed July 15, 1939

INVENTOR.
DAN T. BRADLEY
BY
Kwis Hudson & Kent
ATTORNEYS

Patented June 24, 1941

2,247,163

UNITED STATES PATENT OFFICE 2,247,163

COUPLING

Dan T. Bradley, Detroit, Mich., assignor to Harris Products Company, Akron, Ohio, a corporation of Ohio Application July 15, 1939, Serial No. 284,790

4 Claims. (Cl. 64—11)

This invention relates to flexible, power-transmitting couplings for connecting rotating members or members which are otherwise movable, and constitutes an improvement on the invention described and claimed in my Patent 2,084,761, granted June 22, 1937.

It is one of the objects of the present invention to provide a coupling of relatively low cost that will be efficient in operation, and capable of transmitting power from one moving member to the other even though the members are out of alignment to a substantial degree.

A further object of the invention is to provide an improved form of locking device for so securing the parts of the coupling housing that the coupling will be adapted to rotate in either direction.

Other objects of the invention and the features of novelty will be apparent from the following description, taken in connection with the accompanying drawing, which illustrates two forms of couplings embodying my invention.

Figure 1:
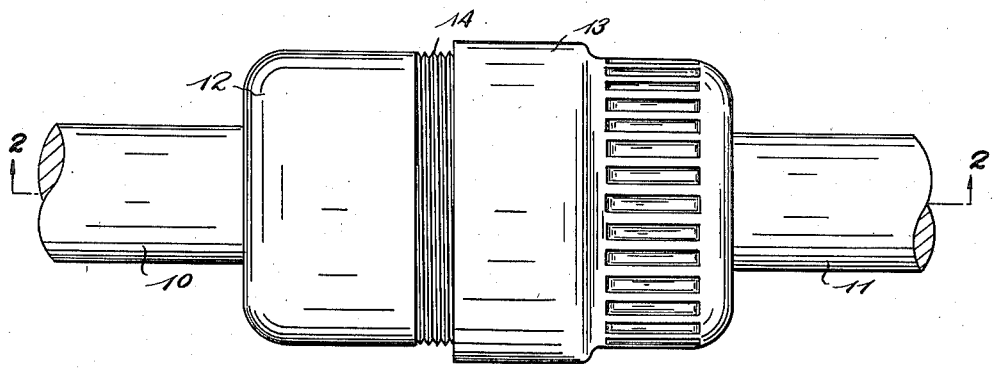
Fig. 1 is an elevation of a coupling as assembled with a driving and a driven shaft.

Referring to the drawing, 10 and 11 indicate two rotatable shafts either of which may be a driving shaft and the other the driven shaft. The coupling comprises two housing parts 12 and 13 which are connected together by screw threads 14, these threads permitting relative axial adjustment of these parts. Within the housing part 12 there is a rubber bushing 15 which fits the shaft 10 and also the interior of the part 12, as shown. Within the part 13 there is a similar bushing 16 which fits the shaft 11. In some instances it is desirable to have means for aligning the shafts 10 and 11 and, for this purpose, I have shown a sleeve 17 which loosely engages the ends of the shafts 10 and 11. The end wall 18 of the part 12 has an opening 19 through which the shaft 10 is inserted, and it will be noted that this opening is somewhat larger than the shaft so that the part 12 will be out of engagement with the shaft and a certain amount of lateral movement of the shaft will be permitted. There is a similar opening 20 in the end wall 21 of the part 13. Between the inner ends of the bushings 15 and 16 there are spacers 22 and 23, and between the inner ends of these spacers there is a lock washer 24 preferably of the type illustrated in Fig. 4.

Figure 2:
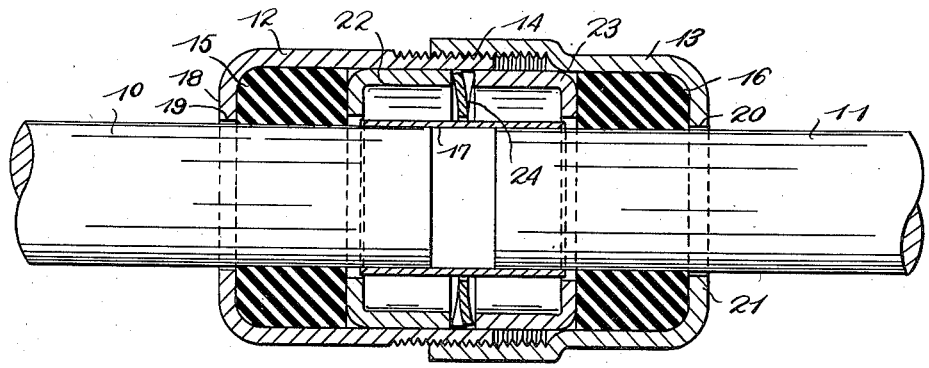
Fig. 2 is a longitudinal section thereof, on line 2—2 of Fig. 1.

The parts of the coupling are assembled on the shafts 10 and 11, as shown in Fig. 2, and the housing parts 12 and 13 are screwed together to compress the bushings 15 and 16 axially and thereby cause them to adhere to the shafts as well as to the interior of the housing parts. Because of the engagement of the spacers 22 and 23 with the inner ends of the bushings 15 and 16 these spacers will be caused to compress the locking member 24 so that it will prevent relative rotation between the spacers when the coupling is in operation. Assuming that the shaft 10 acts as the driving shaft it will be seen that the frictional engagement of the bushing 15 with the shaft will cause the torque to be transmitted to the housing part 12 and the spacer 22 and thence through the housing part 13 and the spacer 23 to the bushing 16 and the shaft 11. It will be noted that, for one direction of rotation of the shaft 10, there will be a tendency for the housing part 12 to be screwed into the housing part 13 which would increase the compression on the bushings 15 and 16, but it will also be noted that the torque will be transmitted directly from the bushing 15 through the spacers 22 and 23 and the locking member 24 to the bushing 15, so that there will be little or no movement in the threads 14 after the coupling has been properly tightened.

An opposite rotation of the shaft 10 would tend to unscrew the housing part 12 from the housing part 13 but, because the locking member 24 prevents relative rotation between the spacing members 22 and 23, the frictional engagement of the bushings 15 and 16 with the housing parts will overcome this tendency to unscrew.

Figures 3, 4:
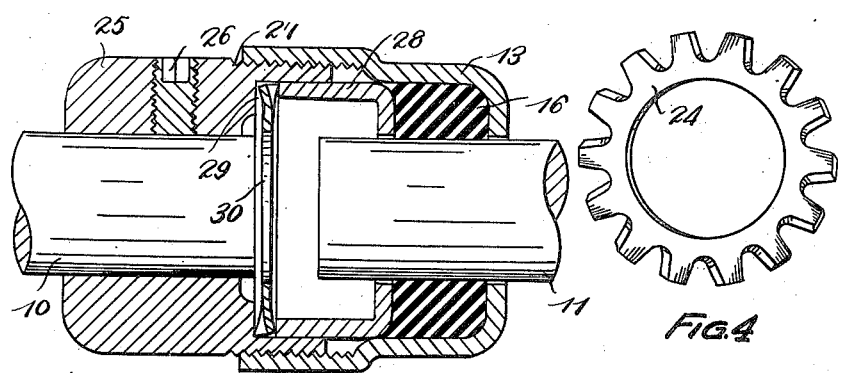
Fig. 3 is a view similar to Fig. 2 but showing another form of the invention.
Fig. 4 is a perspective view of the locking member.

In the form of the invention illustrated in Fig. 3 a metal sleeve 25 is secured on the shaft 10 by a set screw 26 or other suitable means. The sleeve 25 is externally threaded as indicated at 27 to engage the threads of the housing part 13 and the inner end of the sleeve 25 is provided with a bore to receive the spacer 28 which may be similar to the spacers 22 and 23. Between the inner end of the spacer 28 and the surface 29 on the sleeve 25 there is arranged a locking member 30 which is preferably similar to the locking member 24.

The construction illustrated in Fig. 3 functions substantially the same as that illustrated in Figs. 1 and 2 except that there is less flexibility because of the use of only one rubber bushing 16.

While I have illustrated and described what I now consider to be the preferred embodiments of my invention, it will be understood that changes may be made in the details of construction without departing from the spirit of the invention as defined in the appended claims.

Having thus described my invention, I claim:

1. A power-transmitting coupling for connecting two rotatable members comprising a housing, bushings of flexible material adapted to frictionally engage each of said members, spacers within said housing engaging the inner ends of said bushings, a locking member between and engaging said spacers to normally prevent relative rotation of the spacers, said housing having abutments therein engaging the outer ends of said bushings, and said abutments being axially movable relative to said spacers to compress said bushings so that the latter will have substantially non-slipping engagement with said members and the interior of said housing.

2. A power-transmitting coupling for connecting two rotatable members, comprising a two-part housing the parts of which are connected together by screw threads, bushings of flexible material adapted to frictionally engage each of said members, spacers within said housing engaging the inner ends of said bushings, a locking member between and engaging said spacers to normally prevent relative rotation of the spacers, and said housing parts having abutments therein engaging the outer ends of said bushings and whereby said bushings may be compressed axially by tightening the screw thread connection between said housing parts and thereby cause said bushings to have substantially non-slipping engagement with said members, said spacers and the interior of said housing parts.

3. A power-transmitting coupling for connecting rotatable driving and driven members and comprising a housing member flexibly mounted on one of said rotatable members, said flexible mounting comprising a rubber bushing mounted on said rotatable member and having its periphery fitting said housing member, said housing member having an abutment engaging the outer end of said bushing, a spacer engaging the inner end of said bushing, means mounted on the other of said rotatable members and adjustably connected with said housing member so as to compress said bushing axially, and a locking member between and engaging said spacer and said last-mentioned means to normally prevent relative rotation therebetween.

4. A power-transmitting coupling for connecting two rotatable members, comprising an aligning sleeve telescopically engaging the ends of said members, a housing, bushings of flexible material adapted to frictionally engage each of said members, spacers within said housing engaging the inner ends of said bushings, a locking member between and engaging said spacers to normally prevent relative rotation of the spacers, said housing having abutments therein engaging the outer ends of said bushings, and said abutments being axially movable relative to said spacers to compress said bushings so that the latter will have substantially non-slipping engagement with said members and the interior of said housing.

DAN T. BRADLEY.